(12) United States Patent
Kumar (10) Patent No.: US 12,039,782 B2
(45) Date of Patent: Jul. 16, 2024

(54) MONITORING AND IDENTIFYING TRAFFIC TRENDS ASSOCIATED WITH ENTITIES IN A PHYSICAL AREA USING MULTIPLE VIDEO SOURCES

(71) Applicant: DRAGONFRUIT AI, INC, Menlo Park, CA (US)

(72) Inventor: Amit Kumar, Menlo Park, CA (US)

(73) Assignee: DRAGONFRUIT AI, INC, Menlo Park, CA (US)

( * ) Notice: Subject to any disclaimer, the term of this patent is extended or adjusted under 35 U.S.C. 154(b) by 0 days.

(21) Appl. No.: 17/730,882

(22) Filed: Apr. 27, 2022

(65) Prior Publication Data
US 2023/0351758 A1    Nov. 2, 2023

(51) Int. Cl.
*G06V 20/54* (2022.01)
*G06V 20/52* (2022.01)

(52) U.S. Cl.
CPC ............. *G06V 20/54* (2022.01); *G06V 20/53* (2022.01)

(58) Field of Classification Search
CPC ............................... G06V 20/54; G06V 20/53
See application file for complete search history.

(56) References Cited

U.S. PATENT DOCUMENTS

2022/0113731 A1* 4/2022 Yesh ................ G06V 20/10

* cited by examiner

*Primary Examiner* — Daniel T Tekle (57) ABSTRACT

Systems, methods, and software monitor and identify traffic trends associated with entities in a physical area using multiple video sources. In one implementation a video monitoring system identifies an overhead map that defines a physical area monitored by a plurality of video sources. The video monitoring system further, for each of the video sources, identifies a video stream from the video source, identifies landmark points that map an object in the video stream to an object in the overhead map, and identifies one or more traffic areas in the video stream for movement of one or more entities. The monitoring system also monitors traffic in the video streams, identifies trends from the traffic based on the landmarks and traffic areas, and generates a display of the trends.

18 Claims, 7 Drawing Sheets

MONITORING AND IDENTIFYING TRAFFIC TRENDS ASSOCIATED WITH ENTITIES IN A PHYSICAL AREA USING MULTIPLE VIDEO SOURCES

BACKGROUND

Security or surveillance cameras are effective tools for monitoring a physical area, such as a public space, a store, or some other physical areas. The cameras are often connected via wires or wirelessly to a computing device that can display the video streams from the cameras and/or store the video streams for future use. The viewing and storage of the video streams can be local, such as on the same local network, or can be remote, such a remote client system.

However, while the security and surveillance cameras can capture the video streams associated with the physical area of interest, difficulties arise in identifying data of interest from the streams. Often, users may be required to monitor each of the streams individually and identify events of interest from the monitored video. This monitoring of the video streams is inefficient, requiring individuals to monitor the video streams associated with multiple different cameras. Additionally, relying on human monitoring can cause users to miss or otherwise mislabel events that occur within the video streams.

OVERVIEW

Provided herein are systems, methods, and software to monitor traffic trends associated with objects in a physical area using multiple video sources. In one implementation, a method of providing a video processing system includes identifying an overhead map that defines a physical area monitored by a plurality of video sources. The method further includes, for each video source in the plurality of video sources, identifying a video stream from the video source, identifying one or more landmark points, wherein each of the one or more landmark points maps a first object in the video stream to a second object in the overhead map, and identifying one or more traffic areas in the video stream for movement of one or more entities. The method also provides monitoring traffic of the one or more entities in the video streams from the plurality of video sources and identifying one or more trends associated with the traffic based on the landmarks and the traffic areas for the video streams. Once the one or more trends are identified, the method further includes generating a display of the one or more trends.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
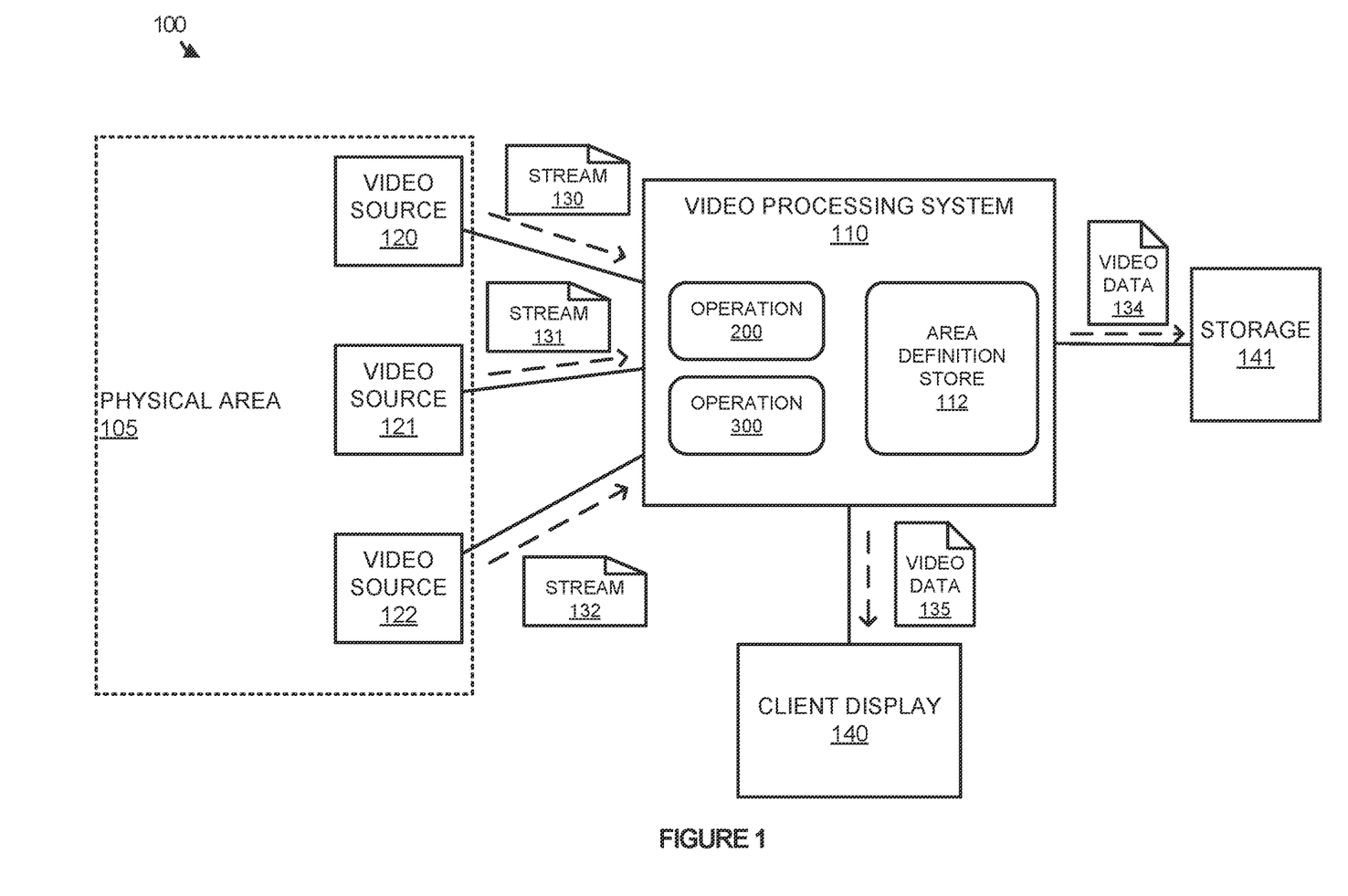
FIG. 1 illustrates a computing environment to monitor traffic trends associated with objects in a physical area using multiple video sources according to an implementation.

FIG. 1 illustrates a computing environment 100 to monitor traffic trends associated with objects in a physical area using multiple video sources according to an implementation. Computing environment 100 includes physical area 105, video processing system 110, client display 140, and storage 141. Physical area 105 may comprise a business, a public place, or some other physical area capable of being monitored by video sources 120-122. Video processing system 110 includes area definition store 112 and provides operation 200 further described below with respect to FIG. 2 and operation 300 further described below with respect to FIG. 3. Video sources 120-122 provide streams 130-132 to video processing system 110. Video processing system 110 provides video data 134 to storage 141 and video data 135 to client display 140. Video processing system 110 may comprise one or more computers, including desktop computers, server computers, laptops, tablets, or some other computer. Client display may comprise a client device, such as a desktop computer, tablet, and the like, or may comprise a monitor directly coupled to video processing system 110.

In computing environment 100, video sources 120-122 comprise surveillance or security cameras that are used to monitor physical area 105 and generate video streams 130-132 that are communicated to video processing system 110. Video sources 120-122 may provide different angles in association with physical area 105, may provide different video qualities (e.g., frame rate, resolution, and the like), or may provide some other aspect in association with physical area 105. Video processing system 110 may process the streams 130-132 and determine trends associated with physical area 105 based at least on an overhead map associated with physical area 105.

In some implementations, video processing system 110 may identify an overhead map associated with physical area 105, wherein the overhead map may comprise a floor plan, a satellite view, or some other overhead map associated with physical area 105. For example, physical area 105 can represent a department store and video sources 120-122 can represent security cameras for the department store. The overhead map can comprise an image format supplied by a user or administrator associated with physical area 105. After identifying the overhead map, video processing system 110 may, for each video stream of video streams 130-132, identify one or more landmark points that each map an object in the video stream to an object in the overhead map. The objects in the video streams may correspond to corners or edges associated with a traffic area, wherein the traffic area may comprise a road, floor, or some other traffic area for entities, such as vehicles, animals, and other moving objects. For example, using the department store example, the objects in the video streams may include corners at the base of the shelves, corners at the base of walls, or some other landmark that can also be identified in the overhead view.

In some implementations, video processing system 110 may provide, for display at client display 140, a stream (or an image taken from the stream) and the overhead map. The user may then select an object in the stream and select a corresponding object in the overhead map to mark a landmark point. The landmark may be used to compare the viewing angles across the different video sources. For example, a user can generate a landmark in association with stream 130 by selecting a first object in an overhead view for physical area 105, wherein the object may comprise a wall, a corner of a wall, a fountain, or some other object. The user can then map the first object to a second object in stream 130, wherein the second object is the physical representation of the first object in stream 130. In some implementations, the landmarks are used to define edges of traffic areas including floors, streets, or some other movement area for one or more entities.

In addition to identifying the landmarks to compare viewing angles between the different angles of video sources 120-122, video processing system 110 further identifies traffic areas in each of the video streams for movement of one or more entities. In some implementations, a user may fill or provide outlines associated with the one or more traffic areas in the different video streams. For example, in a department store, the traffic areas may comprise aisles or floor space associated with patrons of the department store. In another example, for vehicle traffic, curbs and corners can be used to identify the landmarks, and the traffic areas may correspond to streets for the movement of the vehicles. In at least one implementation, the traffic areas can be identified at least in part using auto-recognition, wherein the image provided in the stream can be compared to images of known traffic areas. The comparison may be used to identify colors, patterns, or other information that indicate a portion of the image is a traffic area. In some examples, the user may add to or modify the auto-detected traffic areas to accurately reflect the traffic areas in the current physical area.

After defining the landmarks and the traffic areas for each of streams 130-132, video processing system 110 can monitor traffic in the video streams and identify trends based on the monitored traffic. The trends may correspond to heatmaps, indicating frequently traversed or occupied areas in physical area 105, paths associated with one or more entities in physical area 105, occupancy in the entire physical area or defined regions in the physical area, average visit duration by an entity in the physical area or region, or some other trend. The trends can then be displayed or overlaid as part of the overhead map for physical area 105. In some implementations, video processing system 110 identifies the one or more trends using the landmark points and the traffic areas defined for the various streams. The landmark points and traffic areas may be used to identify the location of entities in association with the overhead map. For example, a person walking through a business may be monitored using the video sources, and the location of the person may be determined based on the landmark points and traffic areas defined for the video streams. The location information of the person (and one or more other people if required) can be used to identify trends in association with the physical area and can be presented within the overhead map to a user.

Figure 2:
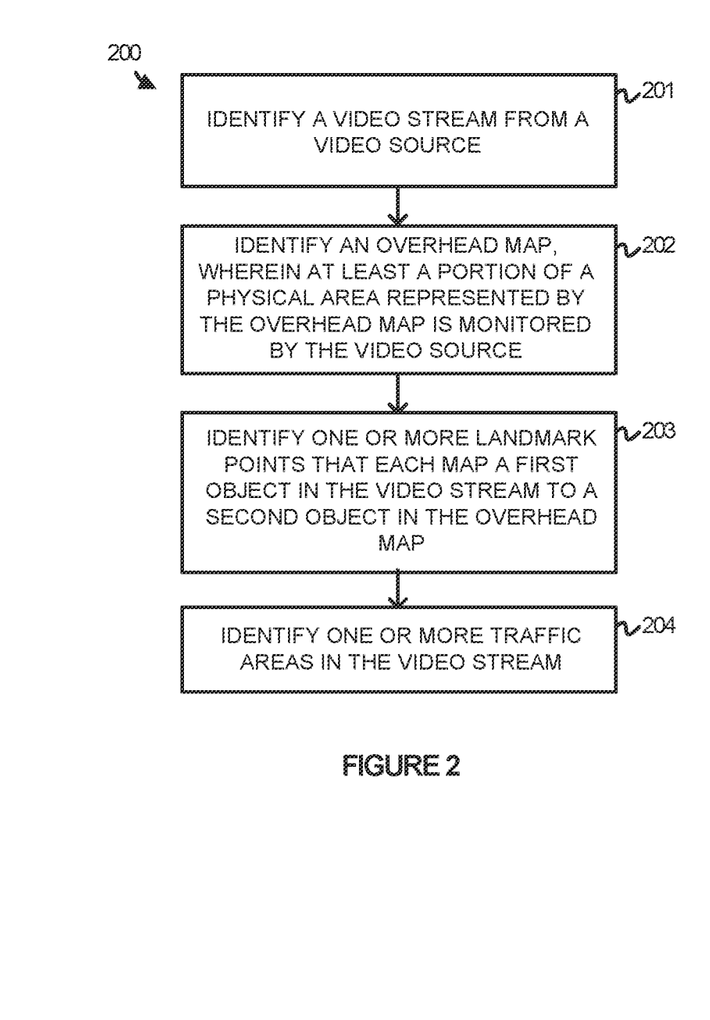
FIG. 2 illustrates an operation of a video processing system to define traffic areas in a video stream according to an implementation.

FIG. 2 illustrates an operation 200 of a video processing system to define traffic areas in a video stream according to an implementation. The steps of operation 200 referenced parenthetically in the paragraphs that follow with reference to computing environment 100 of FIG. 1. Although demonstrated using a single video source in operation 200, similar operations can be performed with additional video sources that provide streams in association with the monitored physical area.

In operation 200, video processing system 110 identifies (201) a video stream from a video source and identifies (202) an overhead map, wherein at least a portion of a physical area represented by the overhead map is monitored by the video source. Once identified, video processing system 110 identifies (203) one or more landmark points, wherein each of the one or more landmark points maps a first object in the video stream to a second object in the overhead map. For example, an overhead map may comprise a map of a department store, including shelving, sitting areas, or other information about the layout of the department store, and the video source (e.g., video source 120) may comprise a security camera that monitors at least a portion of the department store. Video processing system 110 may generate a display that provides the overhead map and at least one frame or image from the stream, permitting a user to select the one or more landmark points in the overhead map and the stream. In the overhead map, the user can select a first object, such as a corner between a shelf and the floor, then can select a second object that corresponds to the physical representation of the corner in stream 130. The landmarks can be used from different streams to identify the orientation or angle associated with the video sources. Thus, a landmark point identified for stream 130 that tags a first object in the overhead map can be used to determine an orientation for video source 120 when compared to a second landmark point identified for stream 131.

In addition to generating the landmarks for the stream, operation 200 further identifies (204) one or more traffic areas in the video stream. In some implementations, the traffic areas are selected by the user of video processing system 110, wherein the user may use shaders, line drawing, or some other mechanism to indicate the traffic areas within the stream. The traffic areas may correspond to floor areas, streets, or some other traffic area for vehicles, animals (including people), or some other entity. Once the landmarks and traffic areas are defined for the streams that cover physical area 105, video processing system 110 may use landmarks and traffic areas to identify traffic trends in association with entities in physical area 105. In some examples, a user may highlight a portion of the overhead map that corresponds to a traffic area of interest. The highlight may include the traffic areas as well as any other object relevant to the traffic area (e.g., shelves in a store, displays, and the like).

Figure 3:
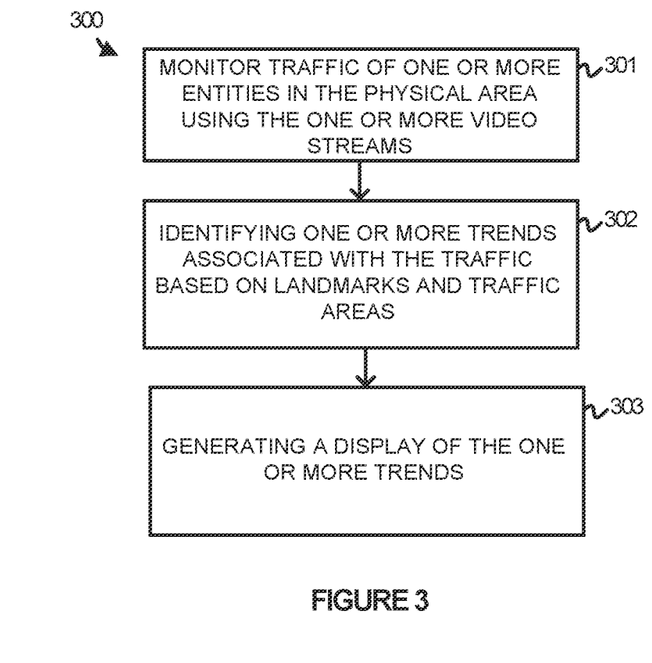
FIG. 3 illustrates an operation of a video processing system to identify trends associated with traffic in a physical area according to an implementation.

FIG. 3 illustrates an operation 300 of a video processing system to identify trends associated with traffic in a physical area according to an implementation. The steps of operation 300 are referenced parenthetically in the paragraphs that follow with reference to systems and elements of computing environment 100 of FIG. 1.

After identifying landmarks and traffic areas for video streams 130-132 using operation 200, operation 300 monitors (301) traffic of one or more entities in in the video streams from the plurality of vide sources. The entities may comprise people, vehicles, or some other moving object. In some implementations, a user associated with video processing system 110 defines the one or more entities to be monitored, and video processing system 110 uses image recognition to identify the one or more entities. For example, a user may generate a first request to monitor all people in physical area 105 using video sources 120-122, the user may further generate a second request to monitor people with specific attributes (shirt color, male/female, and the like).

While monitoring the traffic of the one or more entities, operation 300 further identifies (302) one or more trends associated with the traffic based on the landmarks and the traffic areas for the video streams. In at least one implementation, video processing system 110 identifies the trends in response to a request by a user of video processing system 110. The trends may comprise heatmaps, indicating the frequency that the one or more entities are in various locations of physical area 105, a route trace associated with the one or more users traversing physical area 105, traffic patterns associated with one or more vehicles in physical area 105, or some other trend. In other implementations, video processing system 110 may identify the one or more trends while monitoring the traffic. Returning to the heatmap example, video processing system 110 can update the heatmap periodically, after the addition of an entity in physical area 105, or at some other interval. Advantageously, rather than performing the processing when a trend is requested by a user, the information for the trend can be provided without additional processing to identify the trend. In some implementations, the one or more trends can be identified based on traffic satisfying one or more criteria. For example, if the number of entities (e.g., people) within a region of physical area 105 satisfies a threshold, then video processing system 110 can identify the event as a trend of interest and may save information about the location of the entities in association with the event.

In some implementations, a user of video processing system 110 identifies different regions within the overhead map associated with physical area 105. The different regions may correspond to different departments, different products, or some other different region of interest for a user. For example, a user may identify on the overhead map for physical area 105 different departments associated with a store represented in physical area 105. The different regions can then be considered when identifying trends in association with the traffic for physical area 105. The trends may include heatmaps or frequencies that entities entered the defined regions, statistics associated with the number of entities that entered a region or the length of stay in the region, or some other trend.

After the one or more trends are identified, video processing system 110 generates (303) a display of the one or more trends. In some implementations, a user may request a display of one or more trends of interest. In response to the response to the request, video processing system 110 may generate the display of the requested trends of interest. The display may include the overhead view of physical area 105 with any overlaid information associated with the trends of interest, the display may further include one or more frames from the video sources associated with the trends of interest. For example, the user of video processing system 110 may request a heatmap associated with movement of entities in physical area 105. In response to the request, video processing system 110 may generate a display of the overhead view associated with physical area 105 and overlay the heatmap for the traffic areas associated with physical area 105.

In some implementations, video processing system 110 provides the user with available trends of interest from which the user may select a trend of interest. The trends of interest may comprise heatmaps, may comprise selections for entities relevant to the user (e.g., person with a color of interest shirt), may comprise maps of movement for entities in the physical area, or may comprise some other trend of interest. For example, a user may select a heatmap that indicates the movement of people with relevant attributes within physical area 105. In other examples, the options may include one or more trends that were identified by the monitored traffic information satisfying one or more criteria. In at least one implementation, the options are displayed using client display 140 coupled to video processing system 110 and video data 135 is provided in response to the selections of the options. The display of the one or more trends may further include one or more segments of videos from streams 130-132, animations demonstrating the one or more trends, or some other information about the one or more trends.

Figure 4A:
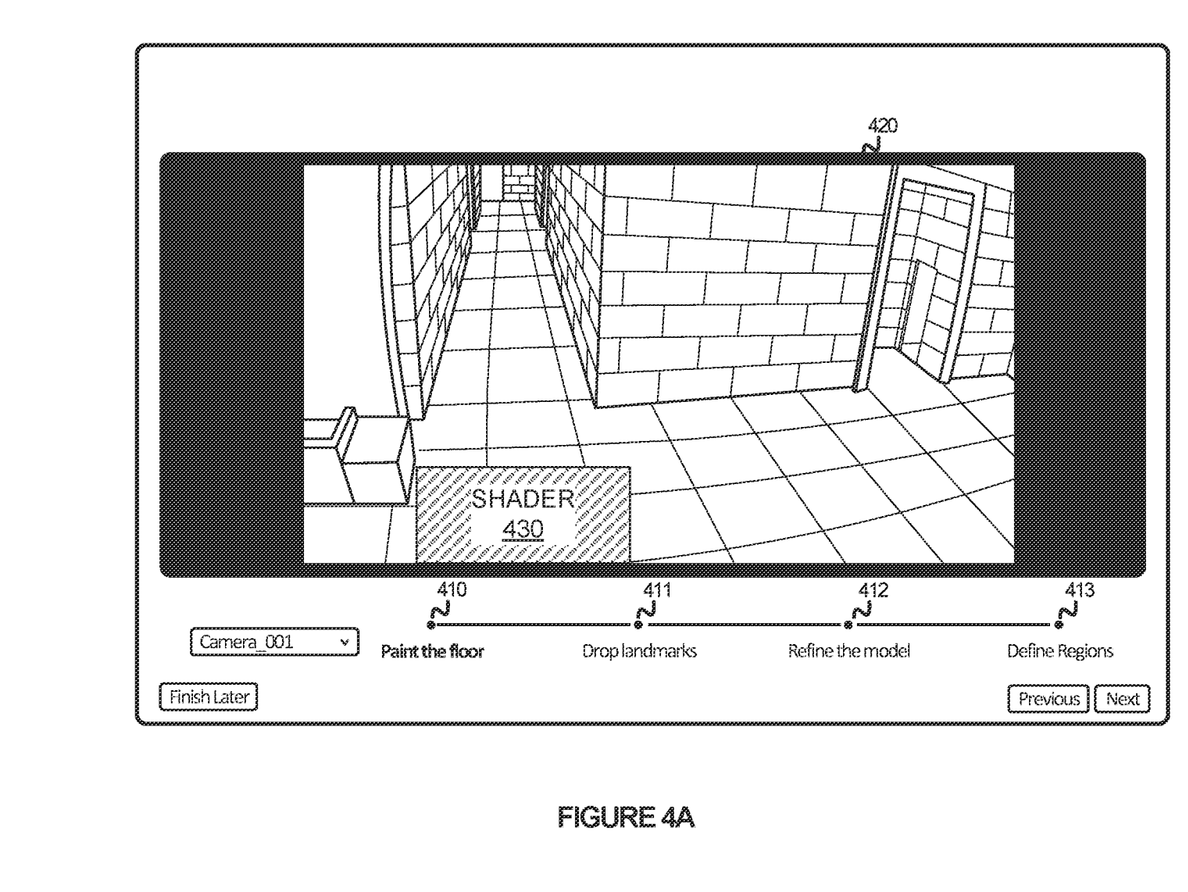
FIG. 4A-4C illustrate a graphical interface to define traffic areas in a video stream according to an implementation.
Figure 4B:
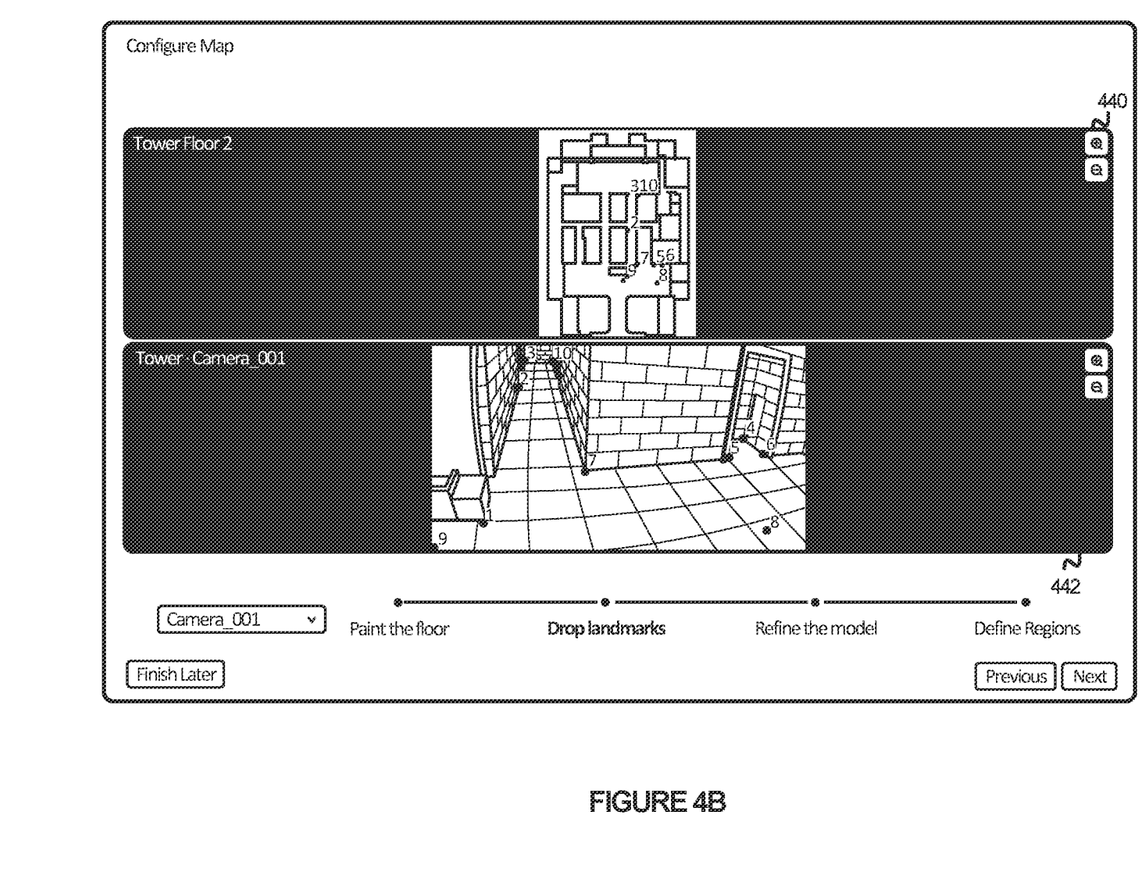
Figure 4C:
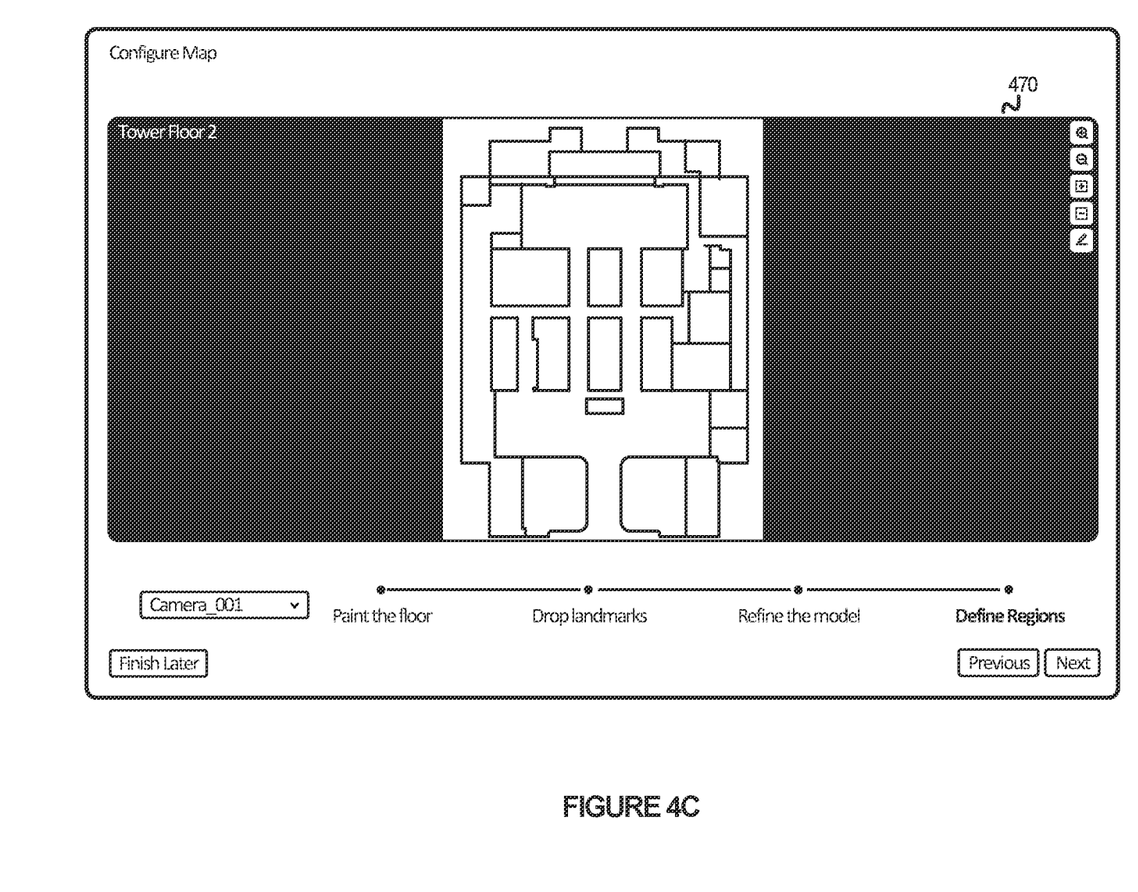

FIG. 4A-4C illustrate a graphical interface to define traffic areas in a video stream according to an implementation. FIGS. 4A-4C are representative of user interfaces provided by video processing system 110 to identify traffic areas and landmark points, although other examples may exist.

FIG. 4A includes options 410-413 and stream 420 and shader 430. FIG. 4A indicates a first interface, permitting a user to define the floor associated a stream from a video source. The user may define the floor using a shader tool, drag and drop tool, or some other tool. For example, shader 430 may be drawn by a user using a mouse of a computer to indicate the traffic area in frame 420. Although a portion of the traffic area is demonstrated in frame 420, the user may increase or modify the shader to accurately reflect the traffic areas represented in the frame.

In some implementations, the traffic area can be identified using auto-recognition, wherein the objects in frame 420 are compared to other known images to identify the traffic areas in the frame. For example, in an indoor space, tile, carpet, or other similar flooring can be compared to known images to identify similarities with the current frame. Portions of the frame that satisfy similarity criteria (i.e., contain similar colors, patterns, and the like) to other known traffic areas from other images can be selected as part of the traffic areas within the frame. In some examples, the video processing system may use a combination of user selection and recognition to identify the traffic areas, wherein a first portion can be identified using the auto-recognition and can be adjusted in accordance with user selection.

FIG. 4B illustrates a selection of the landmark points in the overhead map and the video stream. FIG. 4B includes overhead map 440 and frame 442 from a video stream. Frame 442 matches frame 420 from FIG. 4A. In FIG. 4B, a user may my select a first object in overhead map 440 and a second corresponding object in frame 442. For example, a first object may be selected in overhead map 440 and, once selected, a second object is selected in frame 442 that provides a visual representation of the object from the overhead map. The user may select any number of landmark points within the overhead map and the frame. The landmark points can be used to identify the orientation of the video source in relation to the physical area. The landmark points can also be used to identify the orientation of the video source in relation to other video sources within the same physical area. For example, the user may select landmark points that correspond to corners or edges of walls that are depicted in the overhead map. The video processing system can use the information to identify the location and orientation of the video source relative to the physical area.

In some implementations, following the selection of the landmark points, the user or an automated process from the video processing system may update or refine the traffic areas for the video source. Specifically, by identifying walls and other objects using the landmark points, the video source may identify transition points from the traffic area to non-traffic areas and may update the shading initially created in FIG. 4A.

FIG. 4C illustrates a selection of regions of interest on overhead map to assist in identifying trends for the physical area represented by the overhead map. FIG. 4C includes overhead map 470, which is equivalent to the overhead map 440 demonstrated in FIG. 4B. After providing the landmark points and the traffic areas for a cam 7A user may provide shading, an outline, or some other mechanism to select one or more regions of interest within the physical area. For example, if the overhead map of a store, a user may define one or more regions that are associated with different departments within the store.

In some examples, the regions defined for an overhead map can be duplicated when configuring the landmark points and traffic areas associated with streams from other video sources. Advantageously, a region identified in association with the first video source can be used in association with one or more additional video sources. In other implementations, regions of interest may be unique to each individual video source or a subset of the video sources.

Although demonstrated in the example of FIGS. 4A-4C as configuring the landmark points and traffic areas associated with a single video source, similar operations can be repeated for any additional video sources associated with the monitored physical area. In at least one implementation, when a video source is added, the video processing system may search wired or wireless networks to identify the addition. In response to identifying a new video source, a prompt can be generated by the video processing system, requesting a user to implement the steps provided in FIGS. 4A-4C. In at least one example, regions of interest are not defined for the physical area or can be imported from a previously configured video source.

Figure 5:
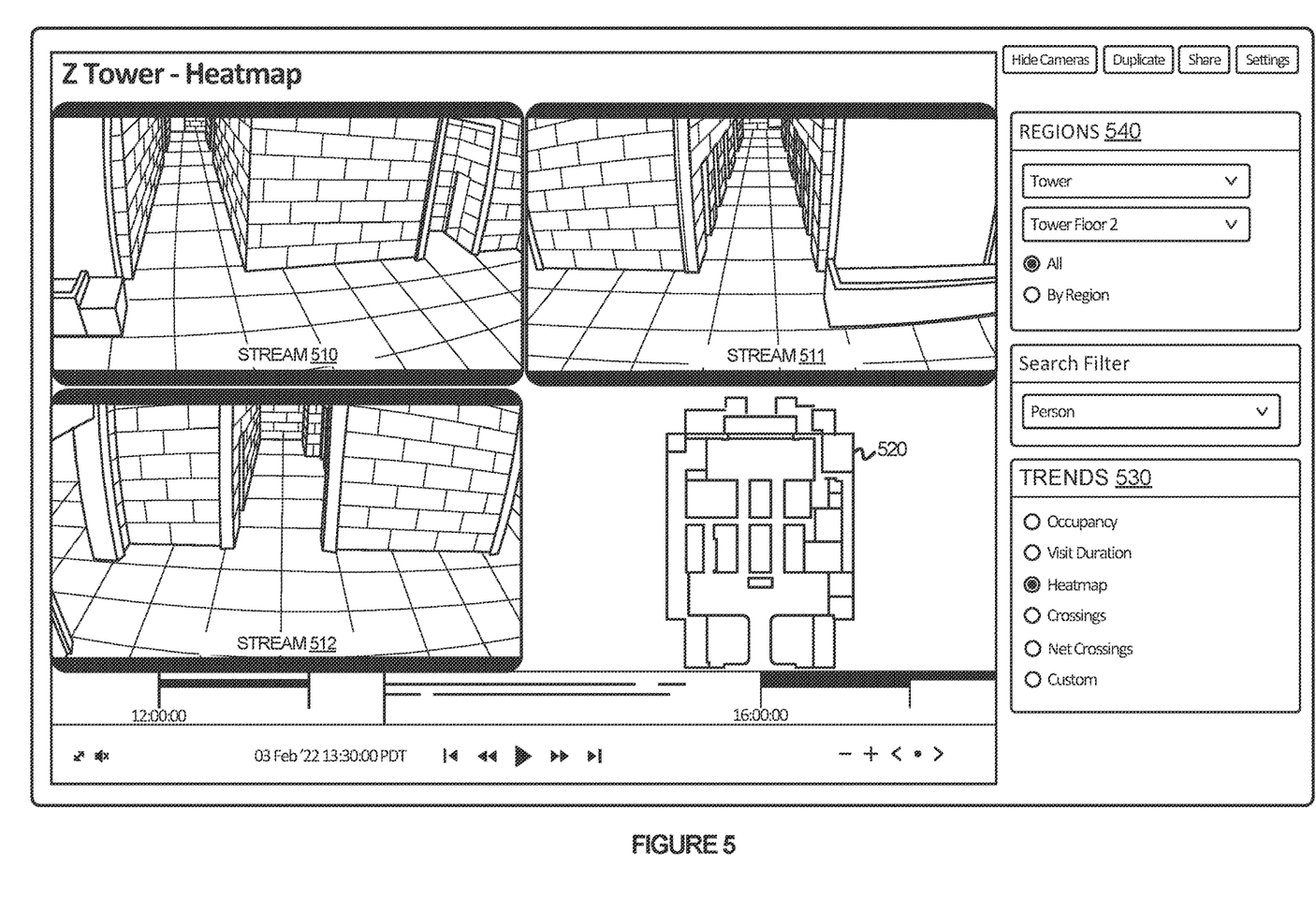
FIG. 5 illustrates a graphical interface to view one or more trends of interest in association with a physical area according to an implementation.

FIG. 5 illustrates a graphical interface to view one or more trends of interest in association with a physical area according to an implementation. FIG. 5 includes streams 510-512 corresponding to different video sources for the physical area, and further includes overhead map 520. FIG. 5 also includes trends 530 and regions 540, which comprise selectable options for the user of a video processing system. The graphical interface in FIG. 5 is representative of an interface that can be generated by video processing system 110 of FIG. 1.

As described herein, after configuring video sources in association with a physical area by defining traffic areas and landmarks, a video processing system may identify trends of interest and display the trends of interest to a user. In some examples, the trends of interest may be identified periodically, in real-time, at the request of a user, or at some other interval. For example, the video processing system may identify heatmaps indicating the length of time that entities occupied different locations within the physical area. In some implementations, a trend of interest is only identified when the movement or existence of one or more entities satisfy one or more criteria. The criteria may include a quantity of entities in the overall physical area, the number of entities within a region of interest, the rate of movement for the entities, or some other information related to the movement of the entities. For example, a trend of interest can be identified when a threshold number of entities enter a region of interest defined by the user.

Here, a user is provided with a list of different trends 530 and regions 540, wherein regions 540 can be defined by the user as part of the configuration of the different feeds. In the example of a store, regions 540 may correspond to different departments or different product lines. In other examples, such as an office building, regions 540 may correspond to a front desk, elevator, hallway, and the like. Trends 530 represent available trend selections associated with the selected region or regions. The example trends 530 include occupancy indicating when a region is occupied, visit duration for one or more of the entities in the physical area, heatmap indicating a frequency the one or more entities were in different locations of the physical area and duration, and other available trends. In some examples, trends will only be available in trends 530 when criteria are met, wherein options in trends 530 may be unavailable unless criteria are met.

In some implementations, the graphical interface may further provide a user with a timeline that permits the user to select relevant portions of the streams and monitor the trends as a function of that timeline. The user may playback the desired period selected in the timeline and view the video streams 510-512 and the status of overhead map 520 during the playback. Accordingly, as heatmap may be monitored or updated periodically or in real-time, the heatmap may change as a function of time during the playback. The playback may be provided in real-time or may be provided at any multiples of real-time, permitting the user to quickly access and view the trend as a function of time.

Although demonstrated in the example of FIG. 5 as permitting a user to select the desired trends for viewing. In some examples, the video processing system may identify a trend of interest and provide a notification to a user, indicating the trend identified. The notification may comprise a text, email, popup, or some other notification. The video processing system may also generate a display of the identified trend, wherein the display can include one or more of the video streams and/or the overhead map with overlaid information about the trend of interest. For example, in response to determining that a region of interest has a quantity of entities (e.g., people) that exceed a threshold, the video processing system may generate a notification and display that identifies the region of interest, information about what triggered the notification (e.g., the threshold being exceeded), one or more of the video streams associated with the physical area and the included region, or some other information.

In some implementations, a user may select information about the types of entities to be monitored within the physical area. The selection can be broad to identify all people, all vehicles, and the like, or can be narrowly defined using one or more selectable attributes associated with the entity. The attributes may include colors, genders, or some other information that can be identified using image processing. The video processing system can then identify one or more trends associated with the selected entities.

Figure 6:
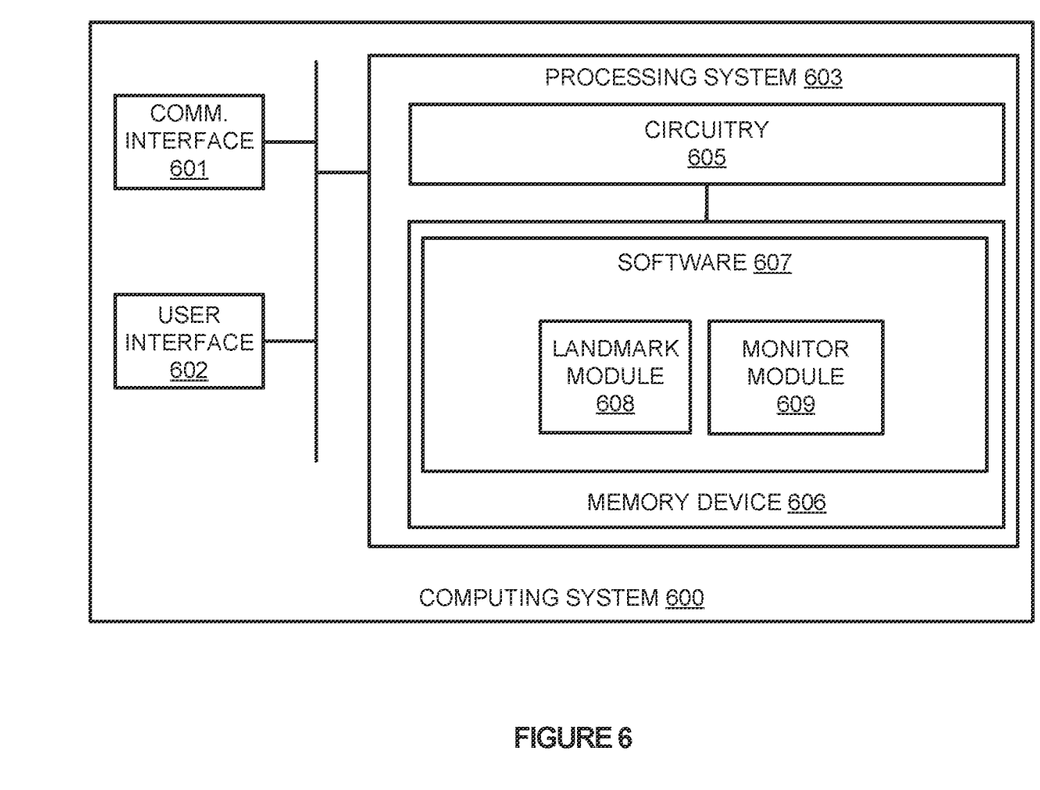
FIG. 6 illustrates a computing system to monitor traffic trends associated with objects in a physical area using multiple video sources according to an implementation.

FIG. 6 illustrates a computing system 600 to monitor traffic trends associated with objects in a physical area using multiple video sources according to an implementation. Computing system 600 is representative of any computing system or systems with which the various operational architectures, processes, scenarios, and sequences disclosed herein for a video processing system, such as video processing system 110 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more video sources including security or surveillance cameras. Communication interface 601 can further be configured to communicate with computing devices that provide storage for the video data associated with the video sources. The computing devices may comprise server computers, desktop computers, or other computing systems available via a local network connection or the internet. Communication interface 601 may also communicate with client computing devices, such as laptop computers or smartphones, permitting a user associated with computing system 600 to provide preferences and selections associated with streams, the overhead map, and the trends of interest.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples. In at least one implementation, user interface Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes landmark module 608 and monitor module 609, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, landmark module 608 directs processing system 603 to identify an overhead map that defines a physical area monitored by a plurality of video sources. Landmark module 608 directs processing system 603 to, for each video source of the plurality of video sources, identify a video stream from the video source and identify one or more landmark points, wherein each of the one or more landmark points maps a first object in the video stream to a second object in the overhead map. The landmark points can be used to determine the orientation of the video source relative to the physical area. For example, a first video source may monitor a first portion of the physical area using at a first orientation, while a second video source may monitor the first portion of the physical area using a second orientation. The landmarks identified for each of the video sources can be compared such that common landmark points identified in the overhead view may provide the orientation of the video sources in association with the overhead map. In some implementations, the objects may be selected via a pointer, a touch screen, or some other user input mechanism associated with the landmarks.

In addition to identifying the landmarks associated with each of the streams, landmark module 608 further directs processing system 603 to identify one or more traffic areas in the video stream for movement of one or more entities. In some implementations, a user may provide input via shaders, lines, or some other mechanism to define the traffic areas. The traffic areas may comprise a floor, a road, or some other traffic area for animals, vehicles, or some other entities. In some implementations, landmark module 608 may identify the traffic areas using image recognition and comparing the current image in the feed to known images of different traffic areas.

After the landmarks and traffic areas are identified, monitor module 609 directs processing system 603 to monitor traffic of the one or more entities in the video streams from the plurality of video sources. While monitoring the different traffic streams, monitor module 609 directs processing system 603 to identify one or more trends associated with the traffic based on the landmarks and the traffic areas for the video streams. The trends may comprise occupancy information for the physical area, visit duration information for the physical area, heatmaps for the physical area, routes for the one or more entities in the physical area, or some other trend. Monitor module 609 may identify the trends periodically, at the request of a user, or at some other interval. Monitor module 609 further directs processing system 603 to generate display of the one or more trends. The display may include the overhead map with any trend information overlaid on the overhead map, the feeds, relevant portions of the feeds in association with the trends, or some other information. For example, a display may indicate a heat map for a period, wherein the popular areas of the map may be indicated using colors, shading, or some other information. The display may also include the feeds for the indicated period.

In some implementations, landmark module 608 and monitor module 609 can be configured to identify specific types of entities, such as people, vehicles, and the like. The modules can use object recognition to differentiate the desired entities from other elements within the streams. For example, monitor module 609 can monitor for people within a department store and may identify faces, clothing, body parts, or other relevant features associated with people to differentiate the people from other elements within the frames.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying an overhead map that defines a physical area monitored by a plurality of video sources;
for each video source in the plurality of video sources:
identifying a video stream from the video source;
identifying one or more landmark points, wherein each of the one or more landmark points maps a first object in the video stream to a second object in the overhead map;
identifying one or more traffic areas in the video stream available for one or more entities to move in the physical area;
monitoring traffic of the one or more entities in the video streams from the plurality of video sources;
identifying one or more trends associated with the traffic based on the landmarks and the traffic areas for the video streams, wherein the one or more trends comprise a heatmap overlaid on the overhead map indicating a frequency the one or more entities were in different locations of the physical area; and
generating a display of the one or more trends.

2. The method of claim 1, wherein the overhead map comprises a floorplan of a building.

3. The method of claim 1, wherein the one or more entities comprise one or more vehicles or one or more animals.

4. The method of claim 1, further comprising obtaining a request for the one or more trends and generating the display of the one or more trends in response to the request.

5. The method of claim 1, wherein the physical area comprises a business, a government building, or an outdoor public place.

6. The method of claim 1, wherein identifying the one or more traffic areas in the video stream comprises identifying the one or more traffic areas in the video stream based on the one or more landmark points.

7. The method of claim 1 further comprising:
identifying regions of interest within the overhead map; and
wherein identifying one or more trends associated with the traffic is further based on the regions of interest.

8. A computing apparatus comprising:
one or more computer readable storage media;
a processing system operatively coupled to the one or more computer readable storage media; and
program instructions stored on the one or more computer readable storage media that, when executed by the processing system, direct the computing apparatus to:
identify an overhead map that defines a physical area monitored by a plurality of video sources;
for each video source in the plurality of video sources:
identify a video stream from the video source;
identify one or more landmark points, wherein each of the one or more landmark points maps a first object in the video stream to a second object in the overhead map;
identify one or more traffic areas in the video stream available for one or more entities to move in the physical area;
monitor traffic of the one or more entities in the video streams from the plurality of video sources;
identify one or more trends associated with the traffic based on the landmarks and the traffic areas for the video streams, wherein the one or more trends comprise a heatmap overlaid on the overhead map indicating a frequency the one or more entities were in different locations of the physical area; and
generate a display of the one or more trends.

9. The computing apparatus of claim 8, wherein the overhead map comprises a floorplan of a building.

10. The computing apparatus of claim 8, wherein the one or more entities comprise one or more vehicles or one or more animals.

11. The computing apparatus of claim 8, wherein the program instructions further direct the computing apparatus to obtain a request for the one or more trends and generate the display of the one or more trends in response to the request.

12. The computing apparatus of claim 8, wherein the physical area comprises a business, a government building, or an outdoor public place.

13. The computing apparatus of claim 8, wherein identifying the one or more traffic areas in the video stream comprises identifying the one or more traffic areas in the video stream based on the one or more landmark points.

14. The computing apparatus of claim 8, wherein the program instructions further direct the computing apparatus to:
identify regions of interest within the overhead map; and
wherein identifying one or more trends associated with the traffic is further based on the regions of interest.

15. A system comprising:
a plurality of video sources; and
a computer communicatively coupled to the plurality of video sources configured to:
identify an overhead map that defines a physical area monitored by a plurality of video sources;
for each video source in the plurality of video sources:
identify a video stream from the video source;
identify one or more landmark points, wherein each of the one or more landmark points maps a first object in the video stream to a second object in the overhead map;
identify on one or more traffic areas in the video stream available for one or more entities to move in the physical area;
monitor traffic of the one or more entities in the video streams from the plurality of video sources;
identify one or more trends associated with the traffic based on the landmarks and the traffic areas for the video streams, wherein the one or more trends comprise a heatmap overlaid on the overhead map indicating a frequency the one or more entities were in different locations of the physical area; and
generate a display of the one or more trends.

16. The system of claim 15, wherein the computer is further configured to obtain a request for the one or more trends and generate the display of the one or more trends in response to the request.

17. The system of claim 15, wherein the physical area comprises a business, a government building, or an outdoor public place.

18. The system of claim 15, wherein the computer is further configured to:
identify regions of interest within the overhead map; and wherein identifying one or more trends associated with the traffic is further based on the regions of interest.

* * * * *